INVENTORS
GLEN L. BOWEN
MILTON FISHMAN
JOHN H. McVAY
ALBERT W. FRANCIS
Donnelly, Mentag & Harrington
ATTORNEYS

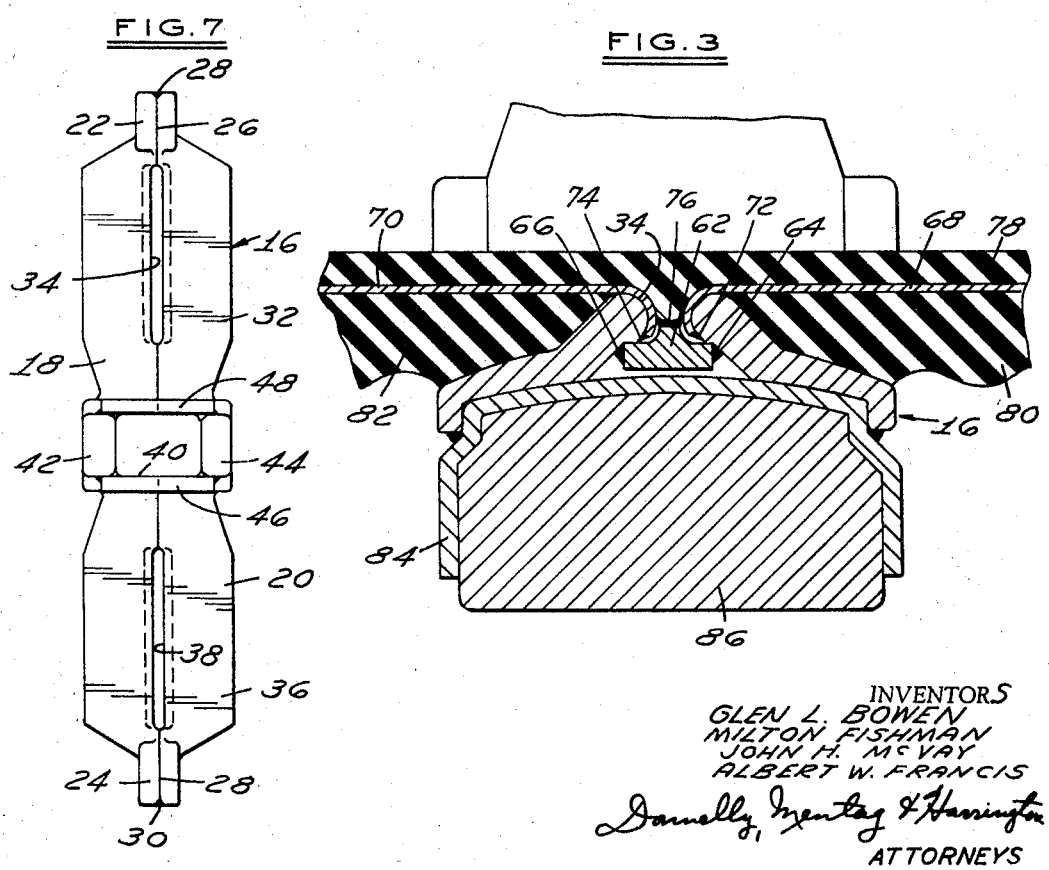

INVENTORS
GLEN L. BOWEN
MILTON FISHMAN
JOHN H. McVAY
ALBERT W. FRANCIS

ATTORNEYS

April 22, 1969  G. L. BOWEN ET AL  3,439,959

ENDLESS STEEL TRACK CONSTRUCTION

Filed July 18, 1967  Sheet 4 of 4

INVENTORS
GLEN L. BOWEN
MILTON FISHMAN
JOHN H. McVAY
ALBERT W. FRANCIS

Donnelly, *illegible* & Harrington
ATTORNEYS

United States Patent Office 3,439,959
Patented Apr. 22, 1969

3,439,959
ENDLESS STEEL TRACK CONSTRUCTION
Glen L. Bowen, Orchard Lake, Milton Fishman, Southfield, John H. McVay, Birmingham, and Albert W. Francis, Farmington, Mich., assignors to G. L. Bowen and Co., Oak Park, Mich., a corporation of Michigan
Filed July 18, 1967, Ser. No. 654,181
Int. Cl. B62d 55/08
U.S. Cl. 305—37                                              8 Claims

ABSTRACT OF THE DISCLOSURE

This specification describes an endless band-track for a tracked vehicle. The track is formed of segmented steel bands that are secured together at a juncture defined in part by transversely disposed track bars which form a part of a track shoe retainer. Rubber is bonded to both the outer and inner sides of the band-track in the region of the juncture of the steel band segments. The elements of the juncture are welded together to form an integral assembly that will accommodate flexure as the band-track traverses a sprocket wheel or a friction drive wheel without the necessity for articulated joints.

*Brief summary of the invention*

Figure 2:
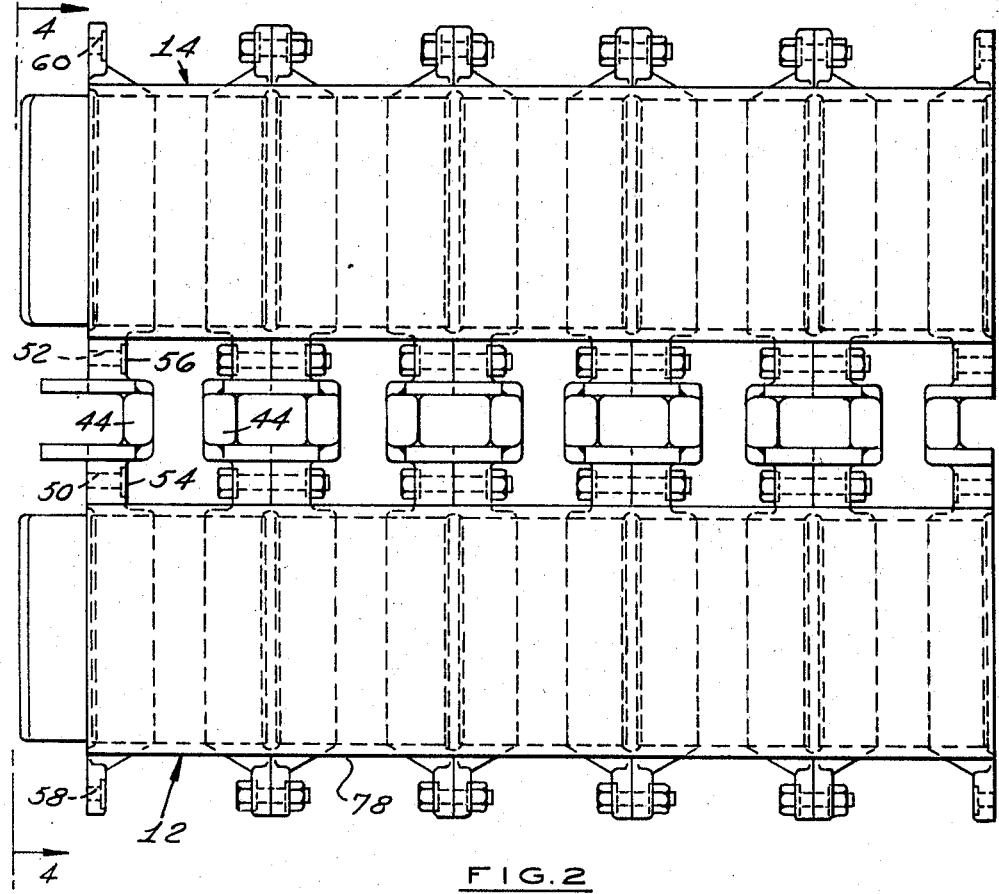

Our invention relates generally to endless belts such as those used in endless tracks for tracked vehicles. It is an object of the invention to overcome the shortcomings found in conventional articulated track constructions such as excessive vibration, noise and short life.

The improved track construction of our invention makes possible an increase in the fatigue life and an improvement in the operating efficiency due to a reduction in energy losses in the track itself.

The track includes two series of steel bands. One series is situated in parallel disposition with respect to the other in the direction of motion of the track. The tandem bands themselves are made up of segments that are situated in end-to-end relationship at a welded juncture. The juncture is defined in part by transversely disposed track bars situated in pairs with rounded, juxtaposed margins over which the adjacent ends of the steel band are located. Rubber is situated between the rounded bars to offer a resistance to flexure. Rubber is bonded also to both sides of the band.

Track shoes may be bolted or otherwise secured to the outer side of the track bars. By preference the track construction is used with pneumatic tires on the vehicle idler wheels and the vehicle drive wheels.

In conventional prior art mechanisms tracks of this kind are formed in multiple segments that are pinned together or otherwise joined in articulated fashion. These are characterized by excessive vibration, a high degree of power loss and a relatively short operating life. Other forms of endless tracks for use with vehicles of this kind include steel cable reinforced rubber tracks, but these do not lend themselves readily to use with sprocket type drives. Such reinforced rubber tracks are confined, furthermore, to relatively low speed operations and their operating life is too short to permit their use with heavy-duty tracked vehicles.

In articulated track constructions currently used, the track is comprised of rigid segments joined together by pins. The segments, because of their rigidity and their relatively large longitudinal dimension, cannot be made to follow a circular path when traversing an idler wheel or a sprocket wheel. Thus each segment must be made to bend at its joint as it traverses the wheel or sprocket. This is a source of vibration. Furthermore, the fatigue stresses thus introduced result in a low operative life.

The improved track construction of our invention makes it possible to use vehicle tracks of the band type which are characterized by an improved operating life and which are capable also of being used with vehicles of increased tonnage for any given track size.

The improved band track construction of our invention provides increased operating efficiency due to the reduction in energy losses in the track. It permits also a high degree of mobility on any type of terrain.

We do not anticipate that our construction will require periodic maintenance or lubrication since the movable parts of the band track do not include sliding friction surfaces.

The flexure of the band to either a concave curvature or a convex curvature can be accommodated with a controlled restraint which contributes to track stability.

*Brief description of the figures in the drawings*

Figure 1:
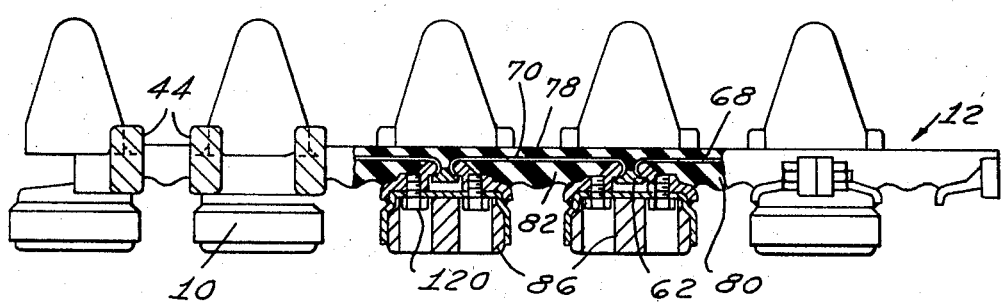
Figure 6:
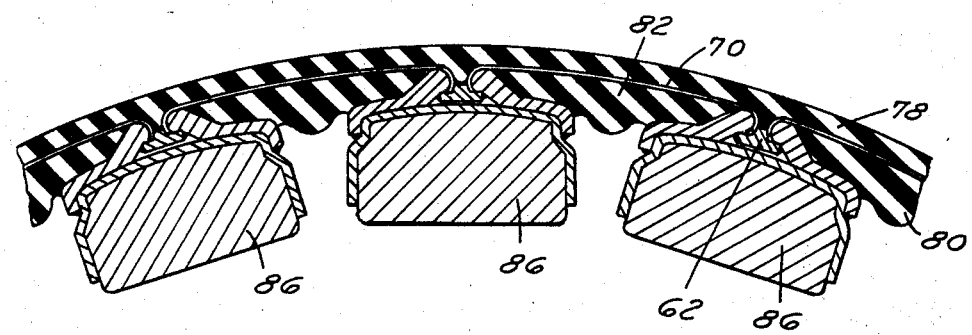
Figure 5:
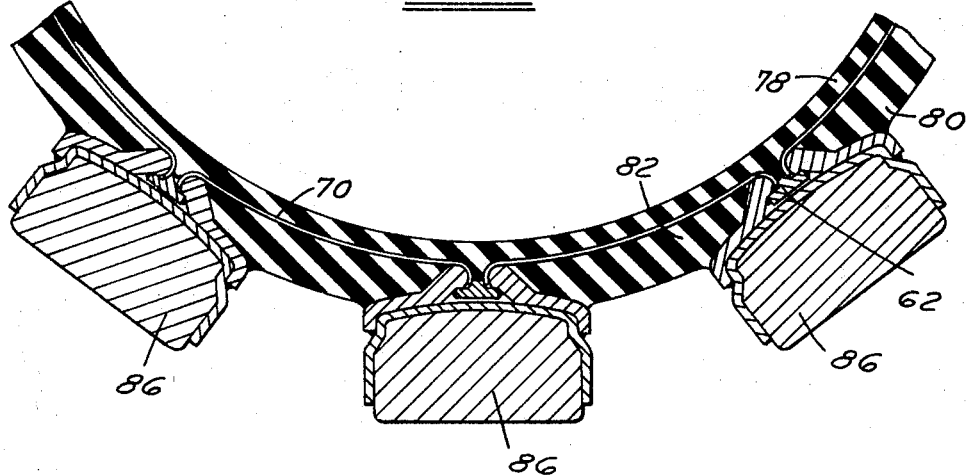
Figure 8:
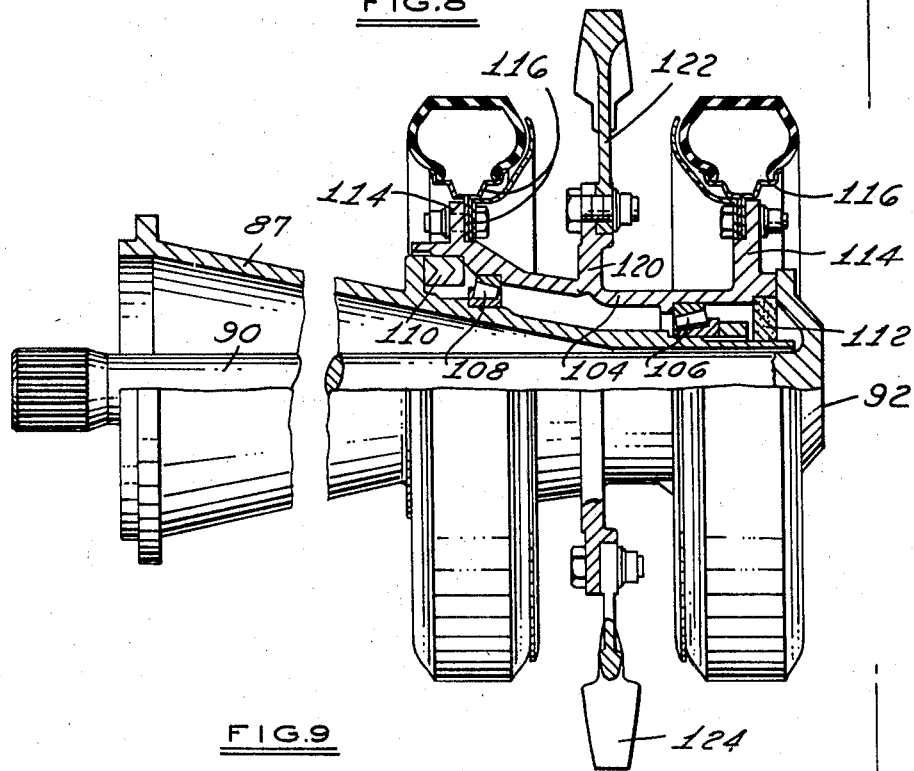
Figure 9:
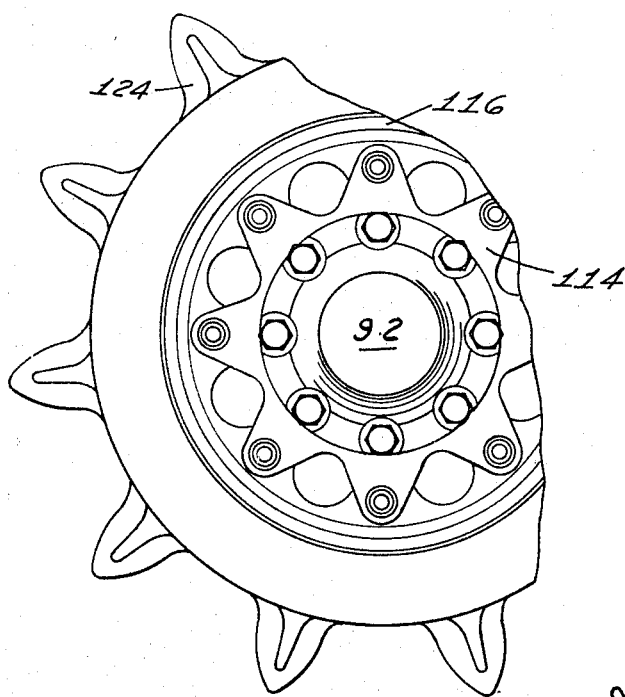

FIG. 1 shows a longitudinal partial sectional view of the band track construction as seen from the plane of section line 1—1 of FIG. 2;
FIG. 2 is a plan view of the band of FIG. 1;
FIG. 3 is an enlargement of a portion of the structure of FIG. 1;
FIG. 4 is an end view of the structure of FIG. 2 as seen from the plane of section line 4—4 of FIG. 2;
FIG. 5 shows the band construction traversing an idler wheel or a friction drive wheel;
FIG. 6 is a view similar to FIG. 5 although it shows a reverse or "back-bend" deflection of the track assembly;
FIG. 7 shows a plan view of the track bars illustrated in FIGS. 1 and 2;
FIG. 8 shows a sprocket wheel in longitudinal cross section which would be used with the band track of FIGS. 1 through 7; and,
FIG. 9 shows an end view of the structure of FIG. 8.

*Particular description of the invention*

In FIGS. 1 and 2, the numeral 10 designates track shoes. These are arranged in pairs, the shoes of each pair being transversely aligned as indicated in FIG. 4.

The band is formed in tandem, one band portion being indicated generally by reference character 12, and the other band portion being shown at 14. The band portions 12 and 14 include common track bars indicated generally by reference character 16 in FIG. 7. Each bar includes two parts 18 and 20. The transverse ends of each part 18 and 20 are formed with bosses 22 and 24. These include juxtaposed surfaces 26 and 28, respectively. The margins of the two bosses 22 and 24 are joined together by a welding as shown in FIG. 7 at 28 and 30, respectively, but a bolted attachment can be used also as shown in FIGS. 2 and 4.

One side of the bar shown in FIG. 1, after the two parts 18 and 20 are assembled in juxtaposed relationship, defines a relatively flat upper surface 32 having an elongated slot 34 formed therein. The two adjacent margins of the slot 34 are rounded as best seen in FIG. 3. A corresponding flat surface 36 is formed on the left hand side of the structure shown in FIG. 7. Like the surface 32, the surface 36 is formed with an elongated slot 38 which corresponds to the slot 34. One side of the structure shown in FIG. 7 is substantially a mirror image of the other side. The region intermediate the surfaces 32 and 36 defines a driving sprocket tooth opening 40 which, by preference, is of elongated rectangular cross section. The ends of the opening 40 terminate in a pair of driving lugs 42 and 44 which, as best seen in FIG. 4, extend upwardly from the plane of the surfaces 32 and 36.

Adjacent the elongated sides of the rectangularly shaped opening 40 is a pair of guide plates 46 and 48. These are welded as shown best in FIG. 4 to the upper surface of the bar 16, in a plane substantially perpendicular to the plane of the surfaces 32 and 36.

Bolt openings 50 and 52 are formed in bosses 54 and 56 in the central region of each of the bars 16. Clamping bolts are received through bolt openings 50 and 52 to maintain the bar parts 18 and 20 in assembled relationship. Bolt openings 58 and 60 are formed in the bosses 22 and 24 to hold the ends of the bars in assembled relationship thereby defining a rigid assembly.

This construction can be reinforced further by means of a transversely extending rib 62 which extends under the surfaces 32 and 34 in the region of the slots 34 and 38. This is best seen in FIGS. 1 and 3. The rib 62 is welded in place by weld metal as indicated at 64 and 66.

Extending between each pair of track bars 16 is a pair of steel bands which cover the surfaces 32 and 36. These surfaces are substantially equal in width to the transverse dimension of their associated bands. Two such bands are indicated in FIGS. 1 and 3 by reference characters 68 and 70. The margins of the bands 68 and 70 are situated in close proximity and they extend into the opening 34 in the bar 16. The margins of the bands 68 and 70 are welded as shown at 72 and 74. The band can be welded also to the rib 62 as shown at 76. A corresponding joint between the cross bars and the margins of the steel bands is provided at each of the slots in the track bars.

A rubber strip 78 is bonded to the inner surface of the steel bands 68 and 70 to provide a continuous track surface. On the outer sides of the bands 68 and 70 there are bonded rubber reinforcements as seen at 80 and 82. These reinforcements are bonded also to the outer surfaces of the track bars.

Reinforcements 80 and 82 extend between each pair of track bars, as indicated best in FIG. 1. The outer surface of the track bar parts 18 and 20 carries a track shoe comprising an outer steel shell 84 within which is bonded a road engaging element 86. The track shoe may be welded in place as seen in FIG. 3, or bolted in place as seen in FIG. 2.

In FIGS. 8 and 9 we have illustrated a typical sprocket wheel which is adapted to engage the sprocket openings formed in the track bars. The sprocket wheel in FIG. 8 includes a housing 87 having a mounting flange 88 which can be bolted to the chassis of a tracked vehicle. A drive shaft 90 extends through the housing 86. Its end may be splined to the torque delivery member of a multiple ratio transmission not shown. The outboard end of the shaft 90 is flanged at 92. An outboard bearing opening 94 journals the shaft 90, a suitable bushing being provided at this location.

The flange 92 is bolted to the hub 96 of a wheel which carries a tire rim 98. Mounted in the rim 98 is a tubeless pneumatic tire 100. The running rim of the tire 100 engages the surface of the bonded rubber 78.

The periphery of the wheel has adhered thereto a guide rim 102 which shrouds one side of the pneumatic tire 100. The guide plates 46 and 48 are situated directly adjacent the shroud 102. Displacement of the wheel 96 in the left hand direction, as viewed in FIG. 8, is prevented by the guide plate 48.

The wheel 96 is connected drivably to a sprocket hub 104 which encircles the housing 87. Hub 104 is journaled on the housing 87 by spaced tapered roller bearings 106 and 108. Fluid seals 110 and 112 retain bearing lubricant in the annular space between the hub 104 and the housing 86.

Connected to the hub 104 is a bolt flange 114 which is secured by bolts to second wheels 116. These wheels, like the wheel 96, carry pneumatic tires. The rims for the tires and the wheels themselves are similar in form to the corresponding structure for wheels 96. The pneumatic tires for each wheel are identical. Each wheel 116 is provided also with a shroud 118 which corresponds to the shroud 102. It is situated directly adjacent guide plate 46. Thus deflection of the wheels relative to the track in the right hand direction as viewed in FIG. 8 is inhibited.

The central region of the hub 104 is formed with a sprocket wheel flange 120 on which is bolted a sprocket wheel 122 having external sprocket teeth 124. These teeth are adapted to register with sprocket teeth openings 40 in the track cross bars.

As the track moves over the sprocket wheels, it will deflect as indicated best in FIG. 5. The flexure is obtained by the resiliency of the steel track bands and the bonded rubber. Virtually no flexure occurs at the joints that connect the ends of the track bands. The bending of the track as indicated in FIG. 5 is accompanied by a slight unwrapping of the ends of the bands from the rounded ends of the track bars with which they cooperate. There is no sharp stress reversal or stress concentration points in the region of the joints.

Upon flexure of the band as indicated in FIG. 5, the rubber that is bonded to the under surface of the track bands and the upper surfaces of the track bars is stressed thereby tending to normally resist bending movement. This resistance, however, is a controlled resistance which tends to maintain stability of the track system.

The same rubber that is bonded to the under side of the track and the top side of the track bars also assists in maintaining stability due to the tendency of the track to deflect in the opposite direction as indicated in FIG. 6. Under these conditions the rubber is placed in compression to produce a normal displacement restoring force on the track bars. The amount of the force is in proportion to the amount of the deflection. Stability thus is achieved during operation.

There is no relative motion between any of the elements and the track system. The flexibility of the track assembly is achieved because of the flexure of the elements themselves rather than because of relative motion between the elements. The only friction involved is the slight internal friction due to the elastic characteristics of the material. Furthermore, high stress concentration points are avoided since any bending of the materials or structural elements occurs over a relatively large distance.

The traction is determined by the track shoes which are an integral part of the track bar assembly. The track bar assembly, together with the sprocket wheels and the pneumatic tires, provide lateral stability and stiffness of the track.

Abrasion and wear due to the contact of the wheels on the track is avoided by the bonded rubber on which the wheels act.

In addition to the increasing resistance to reverse bending due to the resistance of the rubber that is bonded to the upper surface of the bars, a constraint also is provided by the rubber that will eliminate or reduce significantly the normal tendency for twisting of the track bars relative to the steel bands. To augment this effect, the two-part bar construction is arranged so that when their clamping bolts are applied, the bonded rubber is placed into compression at the region between the joints.

We contemplate that at least some of the track wheels may be formed without the sprocket. It is possible under some conditions to rely upon the pneumatic tires as a driving wheel. This would depend, of course, upon the coefficient of friction and the track tension. The friction drive, however, should be complemented by the sprocket. Under such conditions, provision may be made for driving the track through the sprocket when slippage of the friction drive wheels occurs. Under normal conditions, however, the drive wheel does not slip with respect to the track. With a slippage greater than a predetermined value, such as 3%, the sprocket would be inactive and it would simply free-wheel in the drive line.

If desired, the shoes 86 can be bolted in place as indicated in the alternate construction, as shown in FIG. 1. Under these conditions, the track bars can be provided with bosses in which openings are formed to receive the clamping bolts 120.

Having thus described a preferred form of our inven- tion, what we claim and desire to secure by U.S. Letters Patent is:

1. An endless flexible track comprising a series of parallel track bars each extending in a direction transverse to the direction of motion of the track, each track bar being bipartite in form along a plane transverse to said direction and comprising parts with juxtaposed rounded margins which extend for a portion of the length of the bars, steel band segments arranged in end-to-end relationship in the direction of motion of the track, adjacent ends of said segments being turned over the rounded margins of said bar parts and fixed thereto, means for joining together each bar part to form a unitary bar assembly, a rubber strip bonded to the inner surfaces of said steel band segments for accommodating friction wheels, and rubber reinforcements bonded to the inner surfaces of said bars and the outer surfaces of said steel band segments, said reinforcements extending from one bar to the other and yielding to resist flexure of said track.

2. The combination as set forth in claim 1, wherein each of the parts of said bars is formed with two rounded margins, a second pair of steel band segments being situated in end-to-end relationship at a location spaced laterally with respect to said first named band segments, the adjacent ends of each of said second pair of band segments being positioned around the associated rounded margins, a rubber strip secured to the inner surfaces of said second band segments and rubber reinforcements bonded to the outerside of said second band segments and the cooperating inner surfaces of said bars.

3. The combination as set forth in claim 1 wherein sprocket openings are formed in an intermediate region of each of said track bars to accommodate sprocket wheels, and track shoes secured to the outerside of each of said track bars to provide frictional tractive effort.

4. The combination as set forth in claim 2 wherein sprocket openings are formed in an intermediate region of each of said track bars to accommodate sprocket wheels, and track shoes secured to the outerside of each of said track bars to provide frictional tractive effort.

5. The combination as set forth in claim 3, including guide plates secured to the intermediate region of said track bars, said guide plates extending in a plane transverse to the plane of said track bars whereby they are adapted to guide friction wheels riding on said rubber strip.

6. The combination as set forth in claim 4 including guide plates secured to the intermediate region of said track bars and extending in a plane transverse to the plane of said track bars whereby they are adapted to guide friction wheels riding on said rubber strip.

7. An endless flexible track comprising a series of parallel track bars each bar extending in a direction transverse to the direction of motion of the track, each bar being bipartite in form along a plane transverse to said direction and comprising parts with juxtaposed rounded margins which extend for a portion of the length of the bars, steel band segments arranged in end-to-end relationship in the direction of motion of the track, adjacent ends of said segments being turned over the rounded margins of said bar parts and fixed thereto, means for joining together each bar part to form a unitary bar assembly, a rubber strip bonded to the inner surfaces of said steel band segments for accommodating friction wheels, and rubber reinforcements bonded to the inner surfaces of said bars and the outer surfaces of said steel band segments, said reinforcements extending from one bar to the other and yielding to resist flexure of said track, a track wheel engageable with said rubber strip, said track wheel comprising a hub, a rim secured to said hub, a pneumatic tire carried by said rim, a guide plate secured to said bar adjacent said pneumatic tire, and a rigid guide shroud carried by said rim and surrounding in part said pneumatic tire whereby it is adapted to engage said guide plate upon shifting movement of said wheel with respect to said track bars.

8. An endless flexible track comprising a series of parallel track bars, each bar extending in a direction transverse to the direction of motion of the track, each track bar being bipartite in form along a plane transverse to said direction and comprising parts with juxtaposed rounded margins which extend for a portion of the length of the bars, steel band segments arranged in end-to-end relationship in the direction of motion of the track, adjacent ends of said segments being turned over the rounded margins of said bar parts and fixed thereto, means for joining together each bar part to form a unitary bar assembly, a rubber strip bonded to the inner surfaces of said steel band segments for accommodating friction wheels, and rubber reinforcements bonded to the inner surfaces of said bars and the outer surfaces of said steel band segments, said reinforcements extending from one bar to the other and yielding to resist flexure of said track, another portion of said bars being formed with two rounded margins which extend for a portion of the length of the bars, a second pair of steel band segments being situated in end-to-end relationship at a location spaced laterally with respect to said first named band segments, the adjacent ends of said second band segments being positioned around their associated rounded margins, a rubber strip secured to the inner surfaces of said second band segments and rubber reinforcements bonded to the other side of said second band segments and the inner side of said track bars, a track wheel engageable with said bonded rubber strip, said track wheel comprising a hub, a rim secured to said hub, a pneumatic tire carried by said rim, a guide plate secured to said bar adjacent said pneumatic tire, and a rigid guide shroud carried by said rim and surrounding in part said pneumatic tire whereby it is adapted to engage said guide plate upon shifting movement of said wheel with respect to said track bars.

References Cited

UNITED STATES PATENTS

| 2,761,745 | 9/1956 | Atkinson | 305—37 |
| 2,815,988 | 12/1957 | Dowell | 305—37 |

FOREIGN PATENTS

| 671,155 | 8/1929 | France. |

RICHARD J. JOHNSON, *Primary Examiner.*

U.S. Cl. X.R.

305—38, 57